United States Patent
Belt et al.

(10) Patent No.: US 7,167,325 B2
(45) Date of Patent: Jan. 23, 2007

(54) FLEXURED ATHERMALIZED PSEUDOKINEMATIC MOUNT

(75) Inventors: Robert Todd Belt, Mountain View, CA (US); James Burton Prince, Clovis, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 528 days.

(21) Appl. No.: 10/777,006

(22) Filed: Feb. 11, 2004

(65) Prior Publication Data

US 2005/0225768 A1 Oct. 13, 2005

(51) Int. Cl.
    *G02B 7/02* (2006.01)
(52) U.S. Cl. .................................. 359/820; 356/450
(58) Field of Classification Search ................ 359/820, 359/288; 356/450, 498; 374/187; 403/28, 403/30
See application file for complete search history.

(56) References Cited

U.S. PATENT DOCUMENTS

| | | | | |
|---|---|---|---|---|
| 3,674,371 A | * | 7/1972 | Dukes | 356/4.09 |
| 4,883,356 A | * | 11/1989 | deMey, II | 356/326 |
| 5,486,917 A | * | 1/1996 | Carangelo et al. | 356/452 |

* cited by examiner

*Primary Examiner*—Hung Xuan Dang
*Assistant Examiner*—Joseph Martinez

(57) ABSTRACT

A method for designing a base includes (1) selecting a location of a first center of expansion of a child part ($CE_{child}$) relative to a parent part; (2) determining a location of a second center of expansion of a bond joint ($CE_{bond}$) bonding the child part to the base; and (3) determining a location of a third center of expansion of the base ($CE_{base}$) on a centerline, which is defined by the $CE_{child}$ and the $CE_{bond}$, so the $CE_{child}$ does not substantially move relative to the parent part under a temperature change. To determine the location of the $CE_{base}$, the method further includes (a) determining a length change to the child part from the $CE_{bond}$ to the $CE_{child}$ under the temperature change; (b) determining a length of the base that produces the same length change under the temperature change; and (c) locating the $CE_{base}$ at the length away from the $CE_{bond}$.

20 Claims, 8 Drawing Sheets

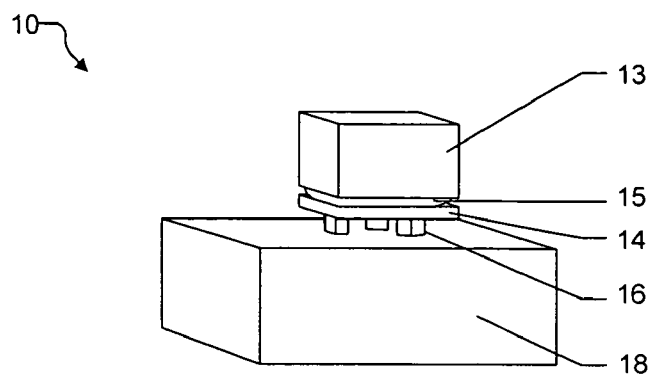
Fig. 1
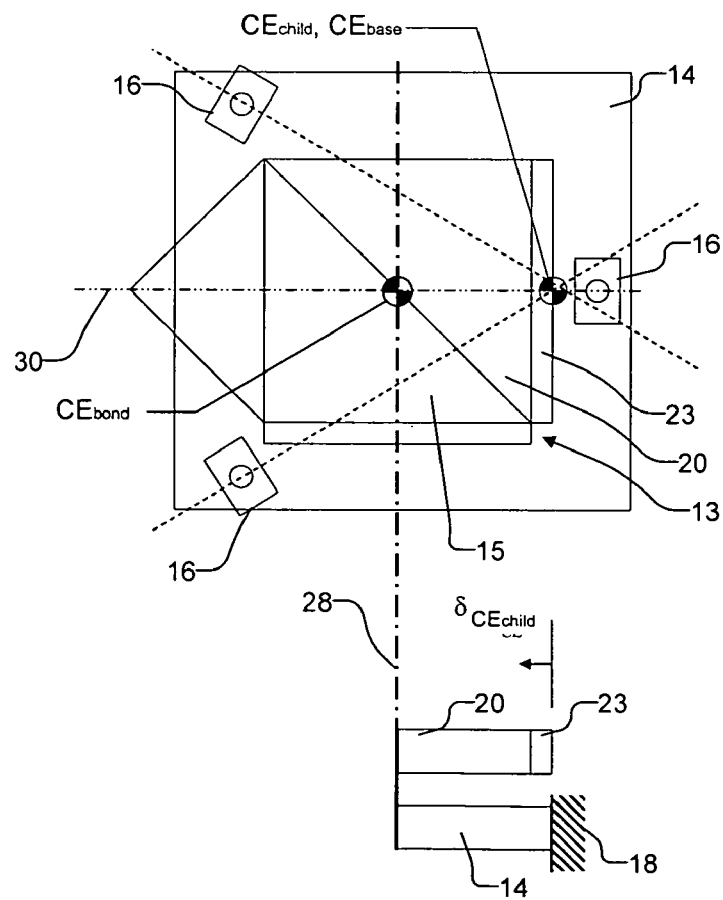
Fig. 2A
Fig. 2B

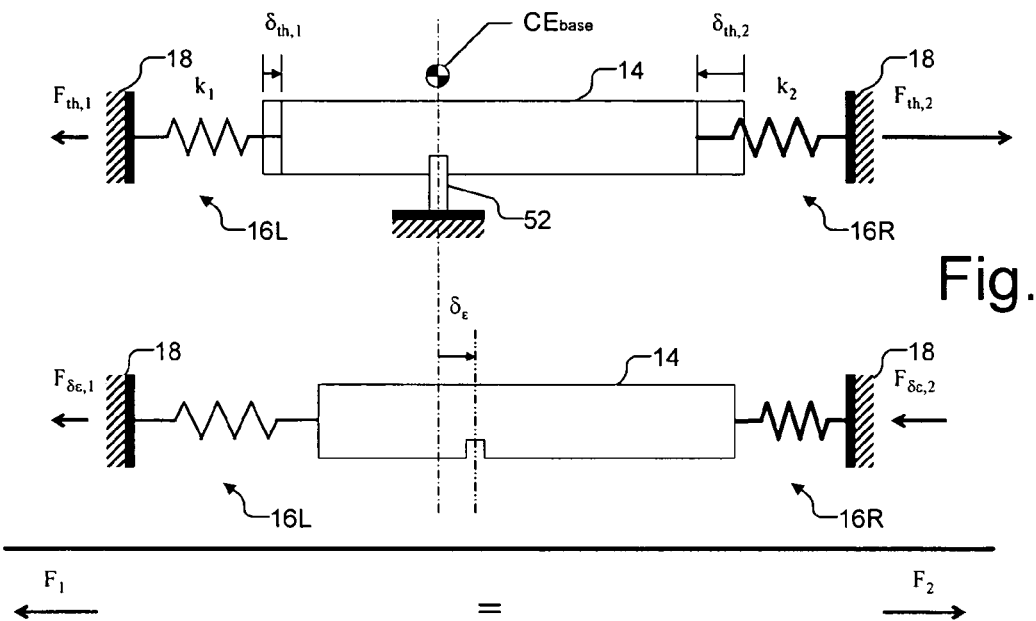
Fig. 5A
Fig. 5B
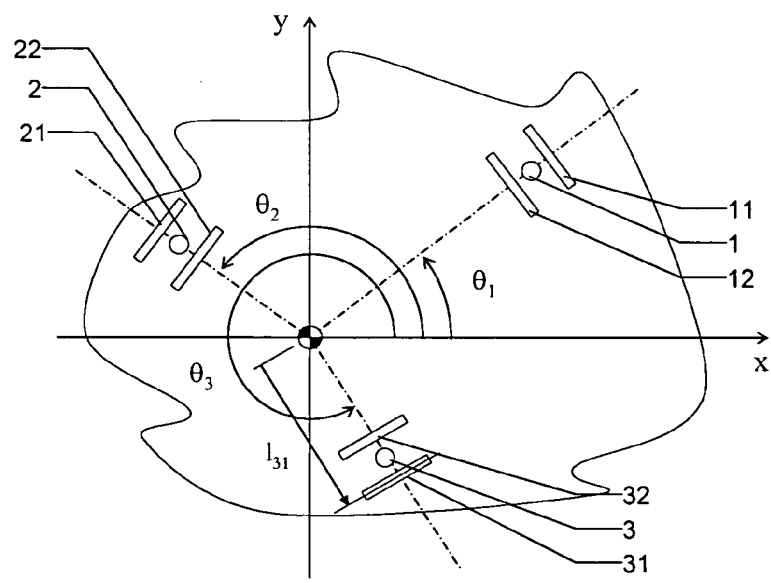
Fig. 5C

FLEXURED ATHERMALIZED PSEUDOKINEMATIC MOUNT

DESCRIPTION OF RELATED ART

For a child part that is bolted on to a parent structure, maintaining an invariant relationship is one of the cardinal issues for precision engineers. There are typically two states that impose different athermalization requirements: operation and shipment/storage. During operation, a distance measuring interferometer (DMI) that is bolted onto a metrology frame must maintain a constant position relative to the metrology frame despite thermal cycling. During shipment/storage, the DMI is not being used but it will see environmental excursions orders of magnitudes higher than it will operationally; which is more likely to cause a permanent misalignment of the system. Thus, a method and an apparatus are needed to athermalize a child part relative to the parent structure.

SUMMARY

In one embodiment of the invention, a method for designing a base includes (1) selecting a location of a first center of expansion of a child part ($CE_{child}$) relative to a parent part; (2) determining a location of a second center of expansion of a bond joint ($CE_{bond}$) bonding the child part to the base; and (3) determining a location of a third center of expansion of the base ($CE_{base}$) on a centerline, which is defined by the $CE_{child}$ and the $CE_{bond}$, so that the $CE_{child}$ does not substantially move relative to the parent part under a temperature change. To determine the location of the $CE_{base}$, the method further includes (a) determining a length change to the child part from the $CE_{bond}$ to the $CE_{child}$ under the temperature change; (b) determining a length of the base that produces the same length change under the temperature change; and (c) locating the $CE_{base}$ away from the $CE_{bond}$ at the length determined from step (b).

BRIEF DESCRIPTION OF THE DRAWINGS

FIG. 1 illustrates an assembly of a child part, a base part, and a parent structure in one embodiment of the invention.

FIGS. 2A and 2B illustrate a concept for setting a center of expansion of the base part that causes a center of expansion of the child part to remain substantially motionless relative to the parent structure in one embodiment of the invention.

FIGS. 5A, 5B, 5C, and 5D illustrate a spring force balance analysis of a base part with asymmetric flexure placement in one embodiment of the invention.

Use of the same reference numbers in different figures indicates similar or identical elements.

DETAILED DESCRIPTION

Figure 3A:
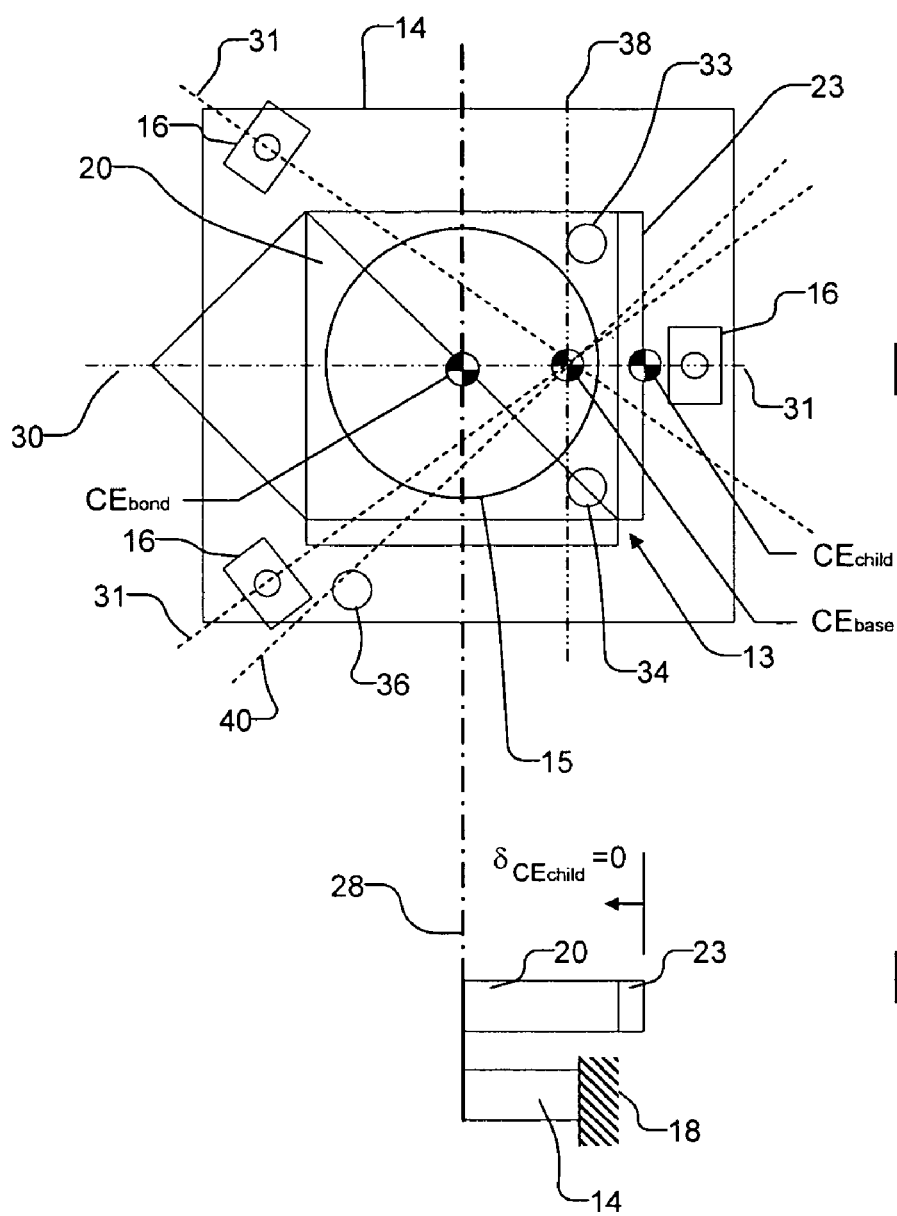
FIGS. 3A and 3B illustrate a refined concept for setting a center of expansion of the base part that causes a center of expansion of the child part to remain substantially motionless relative to the parent structure in one embodiment of the invention.

FIG. 1 illustrates an assembly 10 in one embodiment of the invention. A child part 13 is bonded atop a base part 14 by a bond joint 15. Base part 14 has flexures 16 (only one is labeled for clarity) for mounting child part 13 atop a parent structure 18. The flexure feet have small contact surfaces designed in conjunction with the flexure heights so that the shear force from differential thermal expansion between child part 13 and parent structure 18 is less than the static friction force between the flexure feet and parent structure 18.

FIG. 2A illustrates a concept for designing base part 14 in one embodiment of the invention. A position for the center of expansion of child part 13 (hereafter "$CE_{child}$") is selected. $CE_{child}$ is a point on child part 13 that is desired to remain substantially motionless relative to parent structure 18 when the temperature changes.

In one embodiment, child part 13 is a distance measuring interferometer and parent structure 18 is a metrology frame. Interferometer 13 includes a polarizing beam splitter 20 having a measurement path's quarter-wave plate 23. Typically, a measurement beam exits quarter-wave plate 23, bounces off a measurement mirror mounted to a stage that is being measured, and returns to quarter-wave plate 23. $CE_{child}$ is selected to be located on the outer face of quarter-wave plate 23, which must remain substantially motionless relative to metrology frame 18 for accurate distance measurements of the stage. In one embodiment, a representative requirement is for quarter-wave plate 23 to move less than 10 nm/° C. relative to metrology frame 18.

Initially, the center of expansion of base part 14 (hereafter "$CE_{base}$") is thought to produce the desired result if it coincides with $CE_{child}$. FIG. 2B illustrates a simplified cross-section view used to determine any change in the position of $CE_{child}$ relative to metrology frame 18 under a temperature change. As interferometer 13 is bonded to base part 14 with bond joint 15, expansions of interferometer 13 and base part 14 are determined relative to the center of expansion of bond joint 15 (hereafter "$CE_{bond}$"), which is shown as axis 28 in FIG. 2B. Depending on the materials used, the coefficient of thermal expansion of base part 14 (hereafter "$CTE_{base}$") can be greater or smaller than the coefficients of thermal expansion of polarizing beam splitter 20 and quarter-wave plate 23 (hereafter respectively as "$CTE_{PBS}$" and "$CTE_{QWP}$"). The change in the position of $CE_{child}$ is calculated as follows:

$$\delta_{CE_{child}} = CTE_{base}\Delta Tl_{base} - CTE_{PBS}\Delta Tl_{PBS} - CTE_{QWP}\Delta Tl_{QWP}, \quad (1)$$

where $\delta_{CE_{child}}$ is the change in the position of $CE_{child}$, $\Delta T$ is the temperature change, $l_{base}$ is the length of base part 14 from $CE_{bond}$ to $CE_{base}$ along a centerline 30 defined by $CE_{bond}$ and $CE_{child}$, $l_{PBS}$ is ½ length of polarizing beam splitter 20 (i.e., the length of polarizing beam splitter 20 from $CE_{bond}$ to quarter-wave plate 23), and $l_{QWP}$ is the length of quarter-wave plate 23. As $l_{base}$ is equal to the sum of $l_{PBS}$ and $l_{QWP}$, equation (1) can be rewritten as:

$$\delta_{CE_{child}} = CTE_{base}\Delta T(l_{PBS}+l_{QWP}) - CTE_{PBS}\Delta Tl_{PBS} - CTE_{QWP}\Delta Tl_{QWP} \Rightarrow \delta_{CE_{child}} = (CTE_{base}\Delta Tl_{PBS} - CTE_{PBS}\Delta Tl_{PBS}) + (CTE_{base}\Delta l_{QWP} - CTE_{QWP}\Delta Tl_{QWP}) \Rightarrow \delta_{CE_{child}} = \Delta T[l_{PBS}(CTE_{base} - CTE_{PBS}) + l_{QWP}(CTE_{base} - CTE_{QWP})]. \quad (2)$$

In a typical case, the parameters for equation (2) are:
$CTE_{base} = 9.9 \times 10^{-6}$ 1/° C. based on 416 stainless steel;

$CTE_{PBS}=7.1\times10^{-6}$ 1/° C. based on BK-7;
$CTE_{QWP}=13.2\times10^{-6}$ 1/° C. based on quartz;
$l_{PBS}=15.25\times10^{-3}$ m; and
$l_{QWP}=0.75\times10^{-3}$ m.

Typical precision photolithography environment parameters are:

$$\frac{dT}{dt} \leq 28 \times 10^{-6} \text{ °C/s}(0.1 \text{ °C/hr); and } t_{process} = 300 \text{ s}.$$

Thus, $\Delta T = 8.4 \times 10^{-3}$ °C

So the change in the position of $CE_{child}$ would be 0.34 nm. Thus, $\delta_{CE_{child}}$ is marginally allowable at the current state of technology, but the technology requirements will soon surpass this and a minor reorientation of features is already required due to the shipment/storage requirements for a potentially zero $\delta_{CE_{child}}$.

To ensure that $CE_{child}$ remains substantially motionless relative to metrology frame 18, $l_{base}$ is set as a variable in equation (1) and $\delta_{CE_{child}}$ is set to 0 so that interferometer 13 and base part 14 would expand to the same length when subjected to a temperature change.

$$\delta_{CE_{child}} = CTE_{base}\Delta Tl_{base} - CTE_{PBS}\Delta Tl_{PBS} - CTE_{QWP}\Delta Tl_{QWP} \Rightarrow \quad (3)$$

$$0 = CTE_{base}\Delta Tl_{base} - CTE_{PBS}\Delta Tl_{PBS} - CTE_{QWP}\Delta Tl_{QWP} \Rightarrow$$

$$l_{base} = \frac{CTE_{PBS}}{CTE_{base}} \cdot l_{PBS} + \frac{CTE_{QWP}}{CTE_{base}} \cdot l_{QWP}$$

Figure 3B:
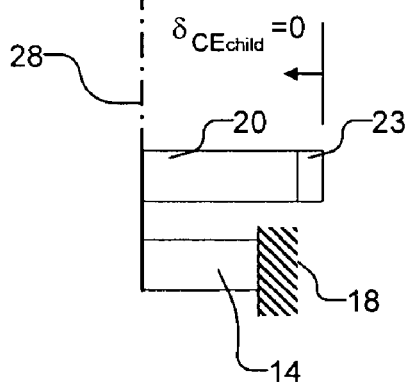

With the values listed above, $l_{base}$ is determined to be $11.94\times10^{-3}$ m. The calculations described above form part of a step 110 (FIG. 7) in method 100 described later. Referring to FIGS. 3A and 3B, $CE_{base}$ is placed $l_{base}$ away from $CE_{bond}$ on centerline 30. The desired location of $CE_{base}$ can be set by placing flexures 16 so their lines of action 31 intersect at the desired location of $CE_{base}$. See FIG. 7, step 112. The line of action of a flexure 16 is defined by its cross-section. For a flexure 16 having a rectangular cross-section with a high aspect ratio (e.g., 6), the line of action is defined by the minor axis of the cross-section. Note that $CE_{base}$ and $CE_{child}$ are not coincident in FIG. 3A.

In one embodiment, metrology frame 18 includes B datum pins 33 and 34, and C datum pin 36 for initially positioning interferometer 13 on metrology frame 18. Accordingly, base part 14 includes a B datum feature 38 (e.g., a recessed plane) for receiving B datum pins 33 and 34, and a C datum feature 40 (e.g., a recessed plane) for receiving C datum pin 36. Datum features 38 and 40 are placed so the directions of their planes run through $CE_{base}$, see FIG. 7, step 114. This prevents base part 14 from thermally expanding against datum pins 33, 34, and 36. This is important during the large temperature excursions of shipment/storage. If the base expansion is restricted by the pins, this would cause the flexure feet to slip, thus loosing the system alignment.

Figure 4A:
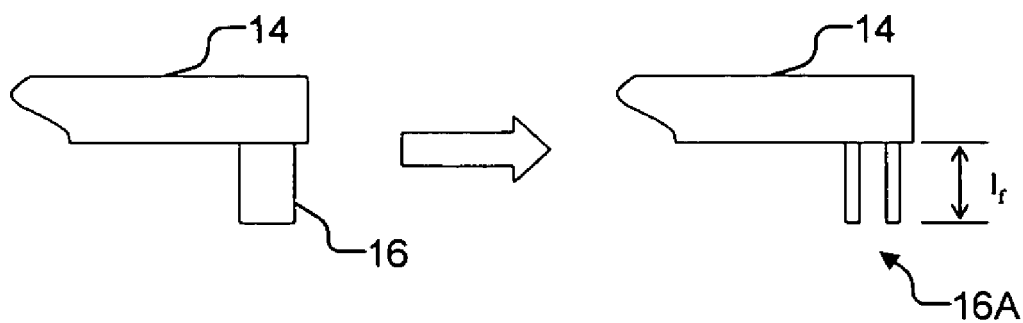
FIGS. 4A and 4B illustrate flexures of the base part in one embodiment of the invention.
Figure 4B:
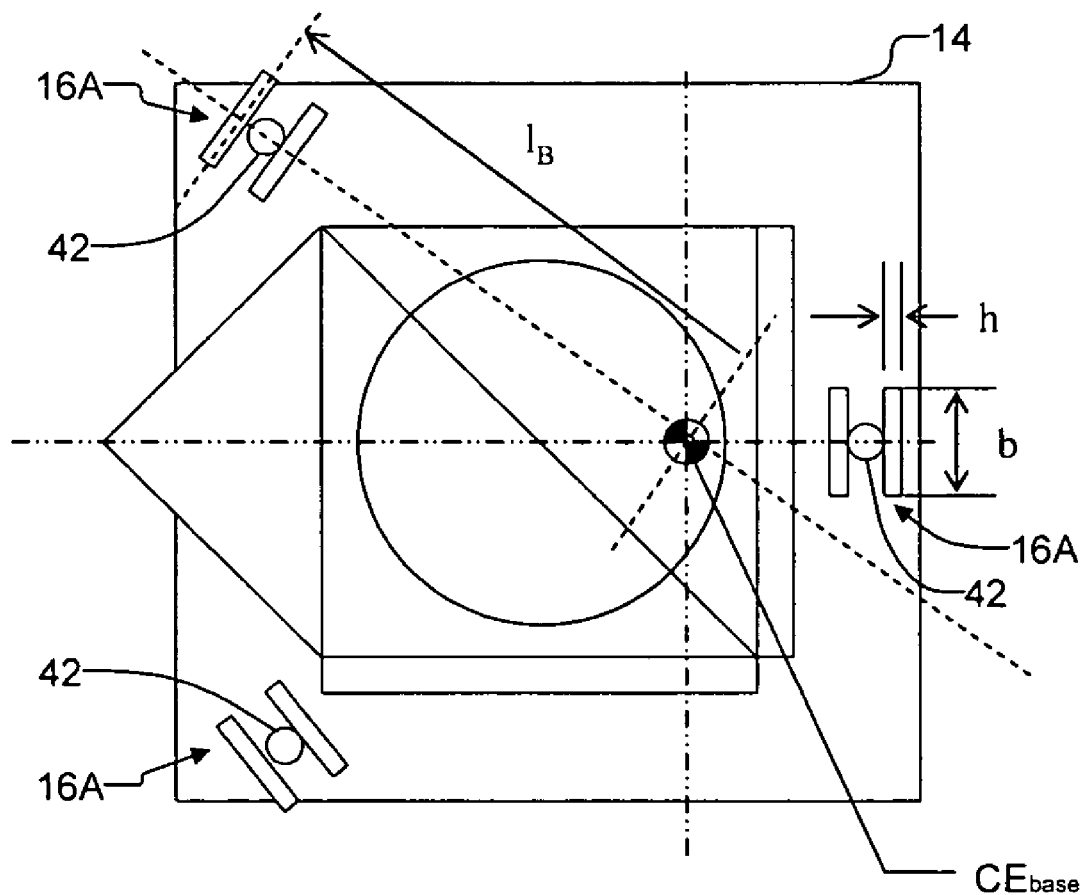

When base part 14 differentially expands or contracts, it becomes convex or concave due to the tip rotation of flexures 16. Typically, it is preferred to not have an induced curvature on the surface of base part 14. FIGS. 4A and 4B illustrate flexure pairs 16A that each consists of two parallel flexures (e.g., a simple leaf linear spring or parallel plate flexures) in one embodiment of the invention. A flexure pair 16A, base part 14, and parent structure 18 form a four bar mechanism that mitigates curvature on the surface of base part 14. Mounting holes 42 are formed in base part 14 between the flexures of flexure pairs 16A. Fasteners (e.g., machine screws) are passed through mounting holes 42 to secure base part 14 to metrology frame 18. Hereafter, a flexure pair and its corresponding machine screw are collectively referred to as a "flexure-machine screw set."

Figure 7:
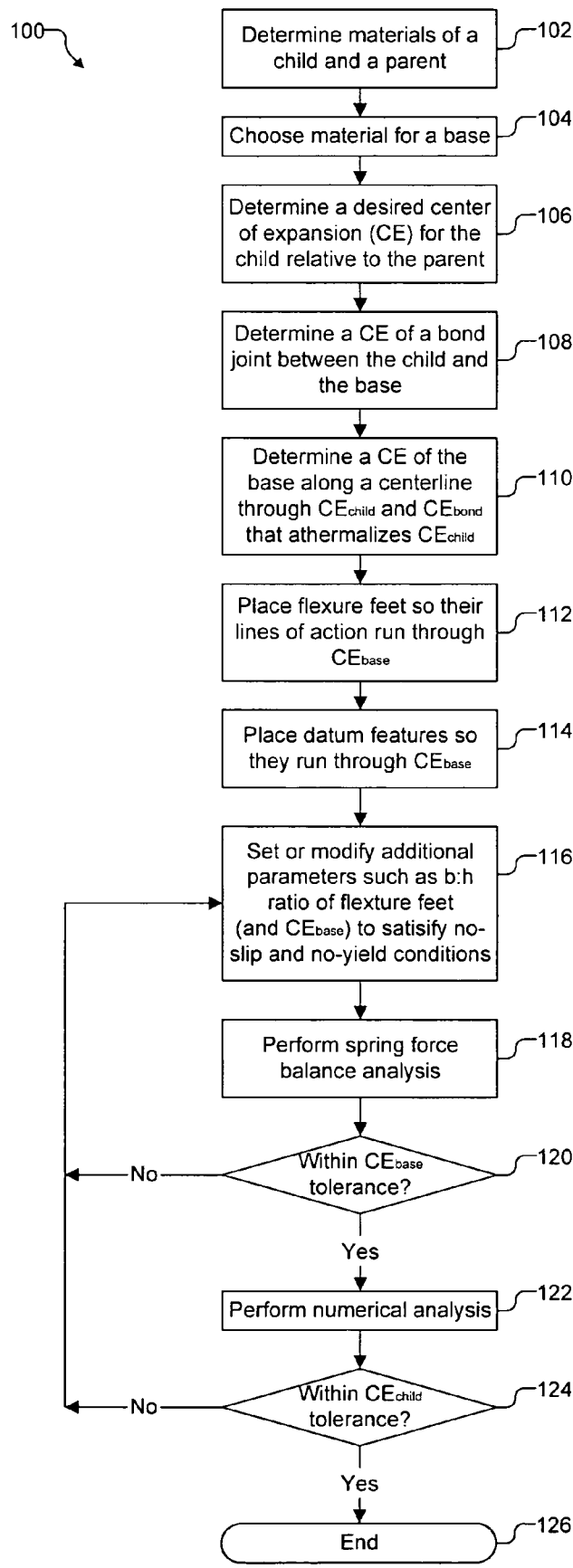
FIG. 7 is a flowchart of a process for designing a base part that causes a center of expansion of a child part to remain substantially motionless relative to the parent structure in one embodiment of the invention.

The length of the flexure is determined so that the shear force experienced by the flexure, which is caused by flexure deflection from the differential thermal expansion between base part 14 and parent structure 18, does not cause the flexure foot to slip on parent structure 18. In one embodiment, the length of the flexure is calculated using a bending model as follows.

$$l_f = \left[\frac{E_f(CTE_{base} - CTE_{parent})\Delta Tbh^3 l_B}{f_{zx}}\right]^{1/3}, \quad (4)$$

where $l_f$ (FIG. 4A) is the length of the flexure, $E_f$ is Young's modulus of the flexure, $CTE_{base}$ is the coefficient of thermal expansion of base part 14, $CTE_{parent}$ is the coefficient of thermal expansion of parent structure 18, $\Delta T$ is the temperature change, b and h (FIG. 4B) are the base and the height of the flexure cross-section, $l_B$ (FIG. 4B) is the distance from $CE_{base}$ to the center of the flexure, and $f_{zx}$ is the shear force experienced by the flexure under deflection, see FIG. 7, step 116. To determine the minimum flexure length $l_f$ that would prevent the flexure foot from slipping on parent structure 18, shear force $f_{zx}$ is set equal to the static friction force between the flexure foot and parent structure 18. Only a bending model is used to determine flexure length $l_f$ because the use of flexure pairs and the use of high aspect ratio cross-section (e.g., 6) essentially ensure that the flexures are in pure bending without shearing. To determine the minimum flexure height, flexure distance $l_B$ is set to the distance of the farthest flexure. The conditions that constrain the flexure geometry are, $\tau_{zx} \leq \tau_{\mu_s}$, which prevents slippage, (4.1)

$\sigma_{vonMises} < \sigma_{YC_{parent}}$, which prevents yielding in the parent structure, and (4.2)

$\sigma_{vonMises} < \sigma_{YC_{child}}$, which prevents yielding in the child part, (4.3)

where $\tau_{zx}$ is the shear stress of the flexure foot under thermal cycling, $\tau_{\mu_s}$ is the static shear stress of the flexure foot under friction, $\sigma_{vonMises}$ is the vonMises stress of the flexure to parent contact under thermal cycling, $\sigma_{YC_{parent}}$ is the yield stress of the parent, and $\sigma_{YC_{child}}$ is the yield stress of the child. See FIG. 7, step 116.

A spring force balance analysis may be necessary to determine the movement of $CE_{base}$ relative to parent structure 18 due to temperature change. This is because flexure pairs 16A may be placed asymmetrically about $CE_{base}$. For example, flexure pairs 16A may be spaced apart at different angles from each other, or flexure pairs 16A may be spaced at different radial lengths from $CE_{base}$. The asymmetric placement of flexure pairs 16A causes them to exert asymmetric forces that cause $CE_{base}$ to move with temperature.

To prevent $CE_{base}$ from moving with temperature, the thermal forces from differential thermal expansion of base part 14 and parent structure 18 must be balanced with the spring forces from flexure pairs 16A. Note that the spring forces due to the machine screws that secure base part 14 to parent structure 18 must also be taken into account. Thus, there are three sets of springs (i.e., three flexure-machine screw sets), with each set containing an outer and inner flexure and a machine screw centered between the flexures. The spring force balance can be determined as follows in one embodiment of the invention.

The radial and tangential spring constants of a flexure are:

$$k_r = \frac{R_{bh} E_f h^4}{l_f^3}, \text{ and} \tag{5}$$

$$k_t = \frac{R_{bh}^3 E_f h^4}{l_f^3}, \tag{6}$$

where $k_r$ is the radial spring constant of the flexure, $R_{bh}$ is the aspect ratio of the flexure cross-section (i.e., $R_{bh} \equiv b/h$), and $k_t$ is the tangential spring constant of the flexure. Note that tangential spring constant $k_t$ is $R_{bh}^2$ times larger than radial spring constant $k_r$. Since a typical aspect ratio is six, then the tangential stiffness is typically 36 times larger than the radial stiffness and thus a line of action of the flexure is defined along the radial direction.

The spring constant of a machine screw is:

$$k_{ms} = \frac{3\pi E_{ms} r^4}{l_{ms}^3}, \tag{7}$$

where $k_{ms}$ is the spring constant of the machine screw, $E_{ms}$ is the Young's modulus of the machine screw, r is the minimum radius of the machine screw, and $l_{ms}$ is the distance from $CE_{base}$ to the machine screw.

FIGS. 5A and 5B illustrate a one-dimensional simple spring force balance model of base part 14 mounted on parent structure 18 by flexures 16L and 16R in one embodiment of the invention. FIG. 5A shows the effect of a net contraction of base part 14 relative to parent structure 18 under a temperature change. A notional pin 52 is used to convey this concept by restraining the movement of base part 14 relative to parent structure 18. Specifically, base part 14 contracts a length $\delta_{th,1}$ at one end and a length $\delta_{th,2}$ at another end relative to $CE_{base}$. These length changes cause (1) a flexure 16L (represented by a spring having a spring constant $k_1$) to exert a force on parent structure 18 and the parent structure 18 to exert an equal but opposite force $F_{th,1}$, and (2) a right flexure 16R (represented by a spring having a spring constant $k_2$) to exert a force on parent structure 18 and the parent structure 18 to exert an equal but opposite force $F_{th,2}$.

FIG. 5B shows a translation of base part 14 caused by an imbalance of forces due to the contraction of base part 14 after the removal of notional pin 52 that restrained the location of $CE_{base}$. Specifically, $CE_{base}$ has moved a distance $\delta_\epsilon$. The translation of base part 14 causes (1) flexure 16L to exert a force on parent structure 18 and the parent structure 18 to exert an equal but opposite force $F_{\delta\epsilon,1}$, and (2) flexure 16R to exert a force on parent structure 18 and the parent structure 18 to exert an equal but opposite force $F_{\delta\epsilon,2}$. When base part 14 and parent structure 18 are in equilibrium, then the sum of all the external forces due to thermal contraction/expansion and the translation of base part 14 must sum to zero.

$$\Sigma F = 0 = \Sigma F_{th} + \Sigma F_{\delta_\epsilon}, \text{ or}$$

$$\Sigma F_{\delta_\epsilon} = -\Sigma F_{th}, \tag{8}$$

where $\Sigma F_{th}$ (subscript should not be bold and not italized) is the sum of the external forces due to thermal contraction/expansion relative to $CE_{base}$, and $\Sigma F_{\delta_\epsilon}$ is the sum of the external forces due to the translation of base part 14. The analytical model is constructed in this form so that $\delta_\epsilon$ can be calculated and then the model variables can be iteratively modified until $\delta_\epsilon$ is within the design specification.

In the two dimensional design model, the $F_{th}$'s are radial relative to $CE_{base}$ as everything expands/contracts radially from $CE_{base}$. Referring to FIG. 5C, the radial forces of the three flexure-machine screw sets due to thermal contraction/expansion are:

$$\Sigma F_{th,x} = \tag{9}$$
$$(F_{th,11r} + F_{th,12r} + F_{th,1ms})\cos\theta_1 + (F_{th,21r} + F_{th,22r} + F_{th,2ms})\cos\theta_2 +$$
$$(F_{th,31r} + F_{th,32r} + F_{th,3ms})\cos\theta_3,$$

and $$\Sigma F_{th,y} = (F_{th,11r} + F_{th,12r} + F_{th,1ms})\sin\theta_1 + \tag{10}$$
$$(F_{th,21r} + F_{th,22r} + F_{th,2ms})\sin\theta_2 + (F_{th,31r} + F_{th,32r} + F_{th,3ms})\sin\theta_3,$$

where $F_{th,11r}$ is the radial force of flexure 11, $F_{th,12r}$ is the radial force of flexure 12, $F_{th,1ms}$ is the force of machine screw 1, $\theta_1$ is the angle of the line of action through the flexure pair formed by flexures 11 and 12, and so forth for the other two set of forces.

Only the forces for one flexure-machine screw set will be described. The forces on the flexure-machine screw set formed by flexures 31 and 32 and machine screw 3 are:

$$F_{th,31r} = -\Delta CTE \cdot \Delta T \cdot l_{31} \cdot \frac{R_{bh,3} E_f h_3^4}{(l_{f3})^3}, \tag{11}$$

$$F_{th,32r} = -\Delta CTE \cdot \Delta T \cdot l_{31}\left(1 - \frac{(g_3 + h_3)}{l_{31}}\right) \cdot \frac{R_{bh,3} E_f h_3^4}{(l_{f3})^3}, \text{ and} \tag{12}$$

$$F_{th,3ms} = -\Delta CTE \cdot \Delta T \cdot l_{31}\left(1 - \frac{(g_3 + h_3)}{2l_{31}}\right) \cdot 3\pi E_{ms} r_3^4 \frac{1}{(l_{f3} + l_{CH3})^3}, \tag{13}$$

where $\Delta CTE$ is the relative coefficient of thermal expansion between base part 14 and parent structure 18 (i.e., $\Delta CTE \equiv CTE_{base} - CTE_{parent}$), $\Delta T$ is the temperature change, $l_{31}$ is the distance from $CE_{base}$ to the center of flexure 31, $$\frac{R_{bh,3} E_f h_3^4}{(l_{f3})^3}$$

is the radial spring constant of flexures 31 and 32, $R_{bh,3}$ is the aspect ratio of flexures 31 and 32 (i.e., $b_3$ to $h_3$), $l_{f3}$ is the flexure length of flexures 31 and 32, $l_{31}$ $$\left(1 - \frac{(g_3 + h_3)}{l_{31}}\right)$$

is the distance from $CE_{base}$ to the to center of flexure 32, $g_3$ is the distance between flexures 31 and 32, $$3\pi E_{ms} r_3^4 \frac{1}{(l_{f3} + l_{CH3})^3}$$

is the spring constant of machine screw 3, $$l_{31}\left(1 - \frac{(g+h)}{2l_{31}}\right)$$

is the distance from $CE_{base}$ to the center of machine screw 3, and $l_{CH3}$ is clearance hole depth. The formulas for the other flexure-machine screw sets are the same but for the substitution of the corresponding parameters.

Figure 5D:
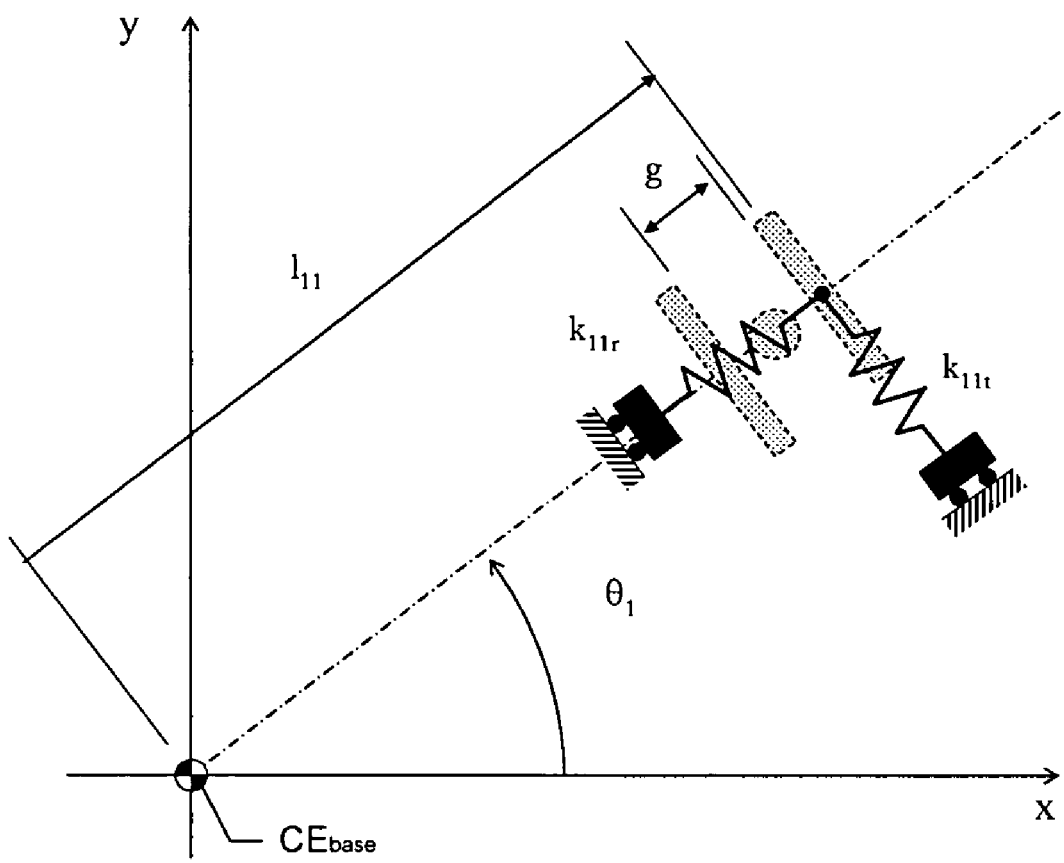

For the left hand side of equation 8, and referring to FIG. 5D, the forces of a flexure-machine screw set i due to the translation of base part 14 is:

$$F_{\delta_\varepsilon,i} \equiv \begin{bmatrix} F_{\delta_\varepsilon x} \\ F_{\delta_\varepsilon y} \end{bmatrix}_i, \text{ where} \quad (14)$$

$$\begin{bmatrix} F_{\delta_\varepsilon x} \\ F_{\delta_\varepsilon y} \end{bmatrix}_i = \begin{bmatrix} \cos(-\theta_i) & \sin(-\theta_i) \\ -\sin(-\theta_i) & \cos(-\theta_i) \end{bmatrix} \begin{bmatrix} 2k_{r,i} + k_{ms,i} & 0 \\ 0 & 2k_{t,i} + k_{ms,i} \end{bmatrix}$$

$$\begin{bmatrix} \cos\theta_i & \sin\theta_i \\ -\sin\theta_i & \cos\theta_i \end{bmatrix} \begin{bmatrix} -\delta_{\varepsilon x} \\ -\delta_{\varepsilon y} \end{bmatrix},$$

where $F_{\delta_\varepsilon,i}$ is the force vector of set i caused by the translation of base part 14, $F_{\delta_\varepsilon x}$ and $F_{\delta_\varepsilon y}$ are the x and y components of force vector $F_{\delta_\varepsilon,i}$, $\theta_i$ is the angle of the line of action through set i, $k_{r,i}$ is the radial spring constant of a flexure in set i, $k_{ms,i}$ is the spring constant of a machine screw in set i.

When multiplied out, equation (14) becomes:

$$F_{\delta_\varepsilon,i} = \begin{bmatrix} 2k_r(\cos^2\theta_i + R_{bh}^2\sin^2\theta_i) + k_{ms} & 2k_r(1 - R_{bh}^2)\cos\theta_i\sin\theta_i \\ 2k_r(1 - R_{bh}^2)\cos\theta_i\sin\theta_i & 2k_r(\sin^2\theta_i + R_{bh}^2\cos^2\theta_i) + k_{ms} \end{bmatrix} \quad (16)$$

$$\begin{bmatrix} -\delta_{\varepsilon x} \\ -\delta_{\varepsilon y} \end{bmatrix},$$

or $$F_{\delta_\varepsilon,i} = \begin{bmatrix} a_i & b_i \\ b_i & d_i \end{bmatrix} \begin{bmatrix} -\delta_{\varepsilon x} \\ -\delta_{\varepsilon y} \end{bmatrix},$$

where $$a_i = 2k_r(\cos^2\theta_i + R_{bh}^2\sin^2\theta_i) + k_{ms},$$

$$b_i = 2k_r(1 - R_{bh}^2)\cos\theta_i\sin\theta_i,$$

and $$d_i = 2k_r(\sin^2\theta_i + R_{bh}^2\cos^2\theta_i) + k_{ms}.$$

The sum of all the forces from the three flexure-machine screw sets can be written as:

$$\sum F_{\delta_\varepsilon} \equiv \begin{bmatrix} a_1 + a_2 + a_3 & b_1 + b_2 + b_3 \\ b_1 + b_2 + b_3 & d_1 + d_2 + d_3 \end{bmatrix} \begin{bmatrix} -\delta_{\varepsilon x} \\ -\delta_{\varepsilon y} \end{bmatrix}. \quad (17)$$

Equation (8) can now be rewritten as:

$$\begin{bmatrix} A & B \\ B & D \end{bmatrix} \begin{bmatrix} -\delta_{\varepsilon x} \\ -\delta_{\varepsilon y} \end{bmatrix} = \begin{bmatrix} -F_{thx} \\ -F_{thy} \end{bmatrix}, \text{ where} \quad (18)$$

$A = (a_1 + a_2 + a_3),$ $B = (b_1 + b_2 + b_3),$ and $D = (d_1 + d_2 + d_3).$

Thus, the movement of $CE_{base}$ is:

$$\begin{bmatrix} \delta_{\varepsilon x} \\ \delta_{\varepsilon y} \end{bmatrix} = \begin{bmatrix} A & B \\ B & D \end{bmatrix}^{-1} \begin{bmatrix} F_{thx} \\ F_{thy} \end{bmatrix}. \quad (19)$$

The design of base part 14 can be modified until the movement of $CE_{base}$ is acceptable. See FIG. 7, step 118.

Figure 6A:
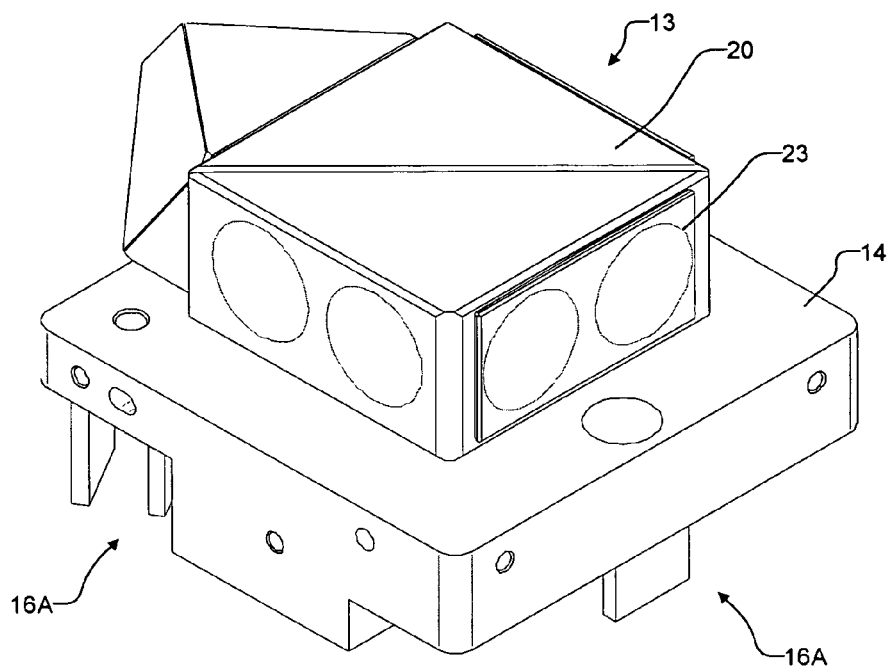
FIGS. 6A, 6B, 6C, 6D, and 6E are schematics of a child part bonded atop a base part in one embodiment of the invention.
Figure 6B:
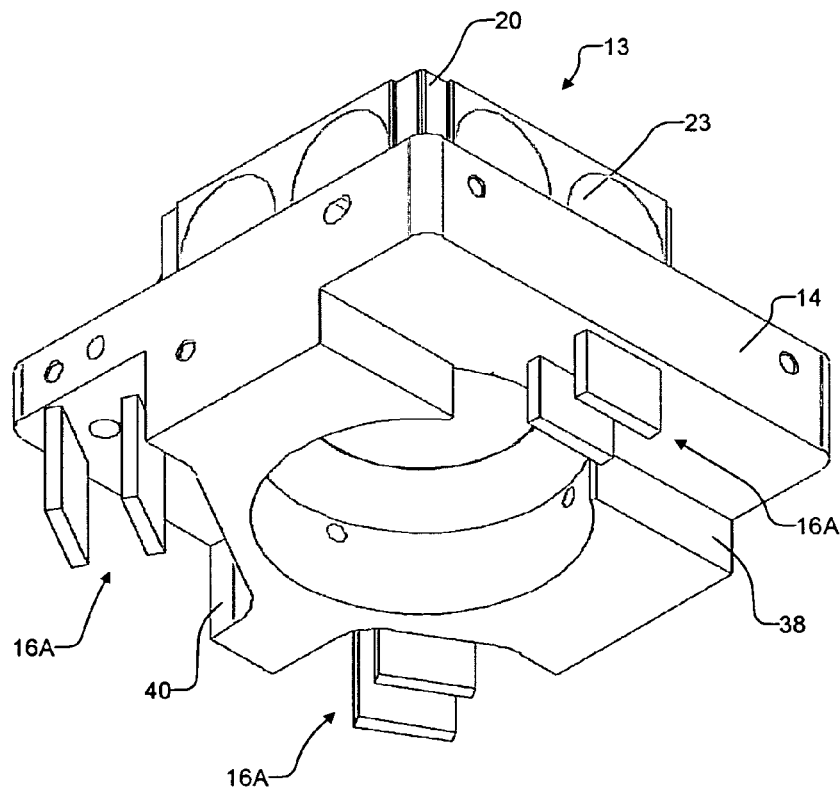
Figure 6C:
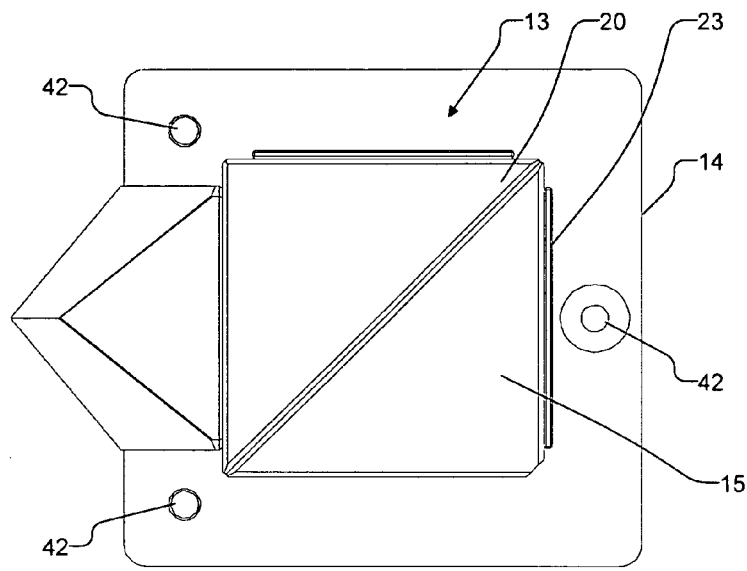
Figure 6D:
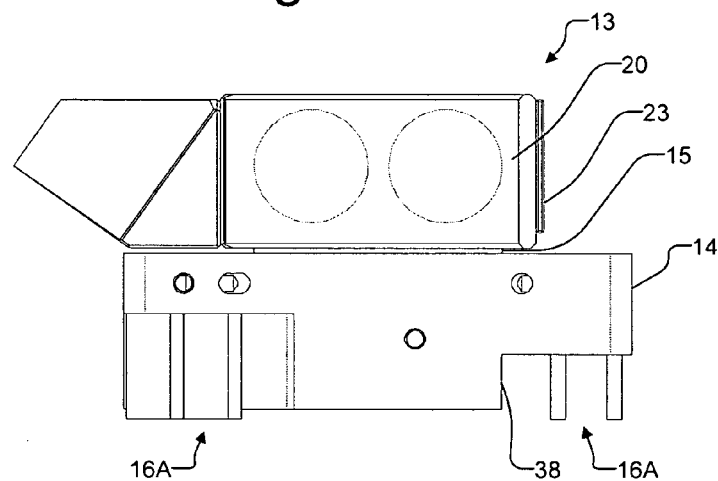
Figure 6E:
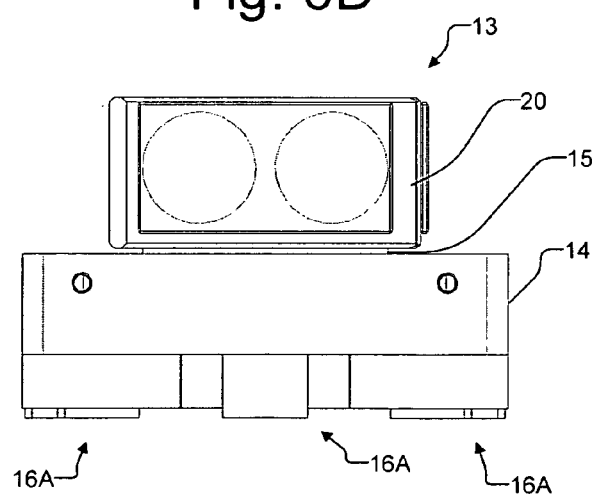

FIGS. 6A, 6B, 6C, 6D, 6E, and 6F illustrate base 14 for mounting interferometer 13 atop metrology frame 18 in one embodiment of the invention. As can be seen in FIGS. 6B and 6D, flexure pairs 16A can have different lengths depending on their placement.

FIG. 7 illustrates a method 100 for designing base part 14 for mounting a child part 13 to a parent structure 18 in one embodiment of the invention.

In step 102, the materials of child part 13 and parent structure 18 are determined. The materials of child part 13 and parent structure 18 are application specific. Typical materials for a precision photolithography application were provided above.

In step 104, the material of base part 14 is selected. Typically, the material of base part 14 is selected so its coefficient of thermal expansion (CTE) matches that of either child part 13 or parent structure 18, or its CTE is a compromise between those of child part 13 and parent structure 18.

In step 106, the desired position for the center of expansion (CE) of child part 13 is selected. As described above, this CE is a point on child part 13 that is desired to remain substantially motionless relative to parent structure 18.

In step 108, the CE of bond joint 15 is determined. Typically, bond joint 15 is symmetrical so this CE is typically located at its geometric center. If bond joint 15 is not symmetrical, then finite element analyses or experimental tests can be performed to determine the CE of bond joint 15.

In step 110, the CE of base part 14 is determined. In one embodiment, the position of this CE is placed along a centerline defined by $CE_{child}$ and $CE_{bond}$ at a distance $l_{base}$ away from $CE_{bond}$. As described above, distance $l_{base}$ can be determined using equation (3).

In step 112, flexures 16 or flexure pairs 16A are positioned on base part 14 so that their lines of action intersect at the desired location of $CE_{base}$.

In step 114, datum features 38 and 40 are positioned on base part 14 so the directions of their planes run through $CE_{base}$.

In step 116, additional parameters of assembly 10 are set (or modified in subsequent loops through step 116). For example, aspect ratio $R_{bh}$ and flexure length $l_f$ of flexure 16 or flexure pairs 16A are set. With the parameters set, the design is checked to make sure that flexures 16 or flexure pairs 16A do not slip with temperature change and they, along with parent structure 18, do not yield. Furthermore, in subsequent loops through 116, the location of $CE_{base}$ can be changed to minimize the movement of $CE_{child}$.

In step 118, a spring force balance analysis is performed to determine the movement of $CE_{base}$ with temperature in the current design of base part 14. As described above, the spring force balance may be necessary when flexures 16 or flexure pairs 16A are asymmetrically placed about $CE_{base}$.

In step 120, the movement of $CE_{base}$ relative to parent structure 18 is compared with the desired tolerance. If the movement is less than the tolerance, then step 120 is followed by step 122. Otherwise step 120 is followed by step 116 where the parameters such as aspect ratio $R_{bh}$, flexure length $l_f$, and the location of $CE_{base}$ are adjusted to reduce the movement of $CE_{base}$ relative to parent structure 18.

In step 122, a numeral analysis is performed to determine the movement of $CE_{child}$ with temperature in the current design of base part 14. In one embodiment, a finite element analysis is performed on the current design of base part 14.

In step 124, the movement of $CE_{child}$ relative to parent structure 18 is compared with the desired tolerance. If the movement is less than the tolerance, then step 124 is followed by step 126 that ends method 100. Otherwise step 124 is followed by step 116 where the parameters such as aspect ratio $R_{bh}$; flexure length $l_f$, the location of $CE_{base}$ are adjusted to reduce the movement of $CE_{child}$ relative to parent structure 18.

Various other adaptations and combinations of features of the embodiments disclosed are within the scope of the invention. Although examples for designing a base for mounting a distance measuring interferometer to a metrology frame are described, the general design process can be applied for designing a base for mounting any child part to any parent structure. Furthermore, the location of $CE_{base}$ can be applied to other interface features in addition to flexures between the base part and the parent structure, such as a ball in groove interface. Numerous embodiments are encompassed by the following claims.

What is claimed is:

1. A method for designing a base for mounting a child part to a parent part, comprising:
   selecting a location of a first center of expansion of the child part ($CE_{child}$) relative to the parent part;
   determining a location of a second center of expansion of a bond joint ($CE_{bond}$) that bonds the child part to the base; and
   determining a location of a third center of expansion of the base ($CE_{base}$) so the first center of expansion ($CE_{child}$) does not substantially move relative to the parent part under a temperature change, wherein the third center of expansion ($CE_{base}$) is located on a centerline defined by the first center of expansion ($CE_{child}$) and the second center of expansion ($CE_{bond}$).

2. The method of claim 1, wherein said determining a location of a third center of expansion of the base ($CE_{base}$) comprises:
   determining a length change of the child part along the centerline from the second center of expansion ($CE_{bond}$) to the first center of expansion ($CE_{child}$) under the temperature change;
   determining a length of the base that produces the same length change under the temperature change; and
   locating the third center of expansion along the centerline at the length away from the second center of expansion ($CE_{bond}$).

3. The method of claim 2, wherein the child part comprises a plurality of child components, said determining a length change to the child part comprises:
   determining length changes to the plurality of child components along the centerline from the second center of expansion ($CE_{bond}$) to the first center of expansion ($CE_{child}$) under the temperature change;
   summing the length changes to the plurality of components as the length change of the child part.

4. The method of claim 1, wherein:
   the child part comprises an interferometer including a beam splitter and a wave plate;
   the first center of expansion ($CE_{child}$) is located at an outer face of the wave plate;
   the second center of expansion ($CE_{bond}$) is located at the center of the bond joint; and
   said determining a location of a third center of expansion of the base ($CE_{base}$) comprises:
      determining a length of the base that produces a same length change as the beam splitter and the wave plate along the centerline from the second center of expansion ($CE_{bond}$) to the first center of expansion ($CE_{child}$) under a same temperature change; and
      locating the third center of expansion ($CE_{base}$) along the centerline at the length away from the second center of expansion ($CE_{bond}$).

5. The method of claim 4, wherein said determining a length of the base comprises:

$$l_{base} = \frac{CTE_{PBS}}{CTE_{base}} \cdot l_{PBS} + \frac{CTE_{QWP}}{CTE_{base}} \cdot l_{QWP},$$

where $l_{base}$ is the length of the base, $CTE_{PBS}$ is a coefficient of thermal expansion of the interferometer, $CTE_{base}$ is a coefficient of thermal expansion of the base, $l_{PBS}$ is a length of the interferometer from the second center of expansion to the wave plate, $CTE_{QWP}$ is a coefficient of thermal expansion of the wave plate, and $l_{QWP}$ is a length of the wave plate.

6. The method of claim 1, further comprising:
   placing a datum feature along a direction that runs through the third center of expansion ($CE_{base}$).

7. The method of claim 1, further comprising:
   setting the location of the third center of expansion ($CE_{base}$) by placing at least three flexures so their lines of action intersect at the location of the third center of expansion of the base ($CE_{base}$).

8. The method of claim 7, further comprising:
   performing a spring force balance analysis to determine a movement of the third center of expansion ($CE_{base}$) relative to the parent part due to the temperature change.

9. The method of claim 8, wherein said performing a spring force balance analysis comprises:
   determining a first plurality of forces caused by a thermal expansion or contraction of the base under the temperature change;
   determining a second plurality of forces caused by a movement of the base under the temperature change;
   summing up the first and the second pluralities of forces to zero; and determining the movement of the third center of expansion ($CE_{base}$) from the summing.

10. The method of claim 8, further comprising:
changing a parameter of the design if the movement of the third center of expansion ($CE_{base}$) is greater than a threshold.

11. The method of claim 10, wherein said changing a parameter of the design comprises changing at least one of an aspect ratio of at least one of the flexures, a length of at least one of the flexures, and the location of the third center of expansion ($CE_{base}$).

12. The method of claim 7, further comprising:
performing a numerical analysis to determine a movement of the first center of expansion ($CE_{child}$) due to the temperature change.

13. The method of claim 12, wherein the numerical analysis comprises a finite element analysis.

14. The method of claim 12, further comprising:
changing a parameter of the design if the movement of the first center of expansion ($CE_{child}$) is greater than a threshold.

15. The method of claim 14, wherein said changing a parameter of the design comprises changing at least one of an aspect ratio of at least one of the flexures, a length of at least one of the flexures, and the location of the third center of expansion ($CE_{base}$).

16. A structure, comprising:
a base comprising at least three mounting interfaces for mounting the base to a parent part;
a child part mounted atop the base by a bond joint;
wherein:
a first center of expansion of the child part ($CE_{child}$) and a second center of expansion of the bond joint ($CE_{bond}$) define a centerline;
the at least three mounting interfaces have lines of action that define a third center of expansion of the base ($CE_{base}$) on the centerline and located at a length away from the second center of expansion ($CE_{bond}$) so the first center of expansion ($CE_{child}$) does not substantially move relative to the parent part under a temperature change.

17. The structure of claim 16, wherein at least one of the mounting interfaces is selected from a group consisting of one flexure plate, two parallel flexure plates, and a ball in groove interface.

18. The structure of claim 17, wherein the base defines at least one mounting hole between the two parallel flexure plates, the mounting hole receiving a fastener for securing the base to the parent part.

19. The structure of claim 16, wherein the base further comprising a datum feature, the datum feature comprises a plane along a direction that runs through the third center of expansion ($CE_{base}$).

20. The structure of claim 16, wherein the child part comprises an interferometer and a wave plate mounted to a face of the interferometer, and the first center of expansion ($CE_{child}$) is located at an outer face of the wave plate.

* * * * *